United States Patent
DeLuca et al.

(10) Patent No.: US 8,707,302 B2
(45) Date of Patent: Apr. 22, 2014

(54) TECHNIQUES FOR PERSONALIZING FEED CONTENT IN VIRTUALIZED COMPUTING ENVIRONMENTS

(75) Inventors: Lisa S. DeLuca, San Francisco, CA (US); Brian D. Goodman, Brooklyn, NY (US); Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/985,412

(22) Filed: Jan. 6, 2011

(65) Prior Publication Data

US 2012/0180040 A1 Jul. 12, 2012

(51) Int. Cl.
*G06F 9/455* (2006.01)
(52) U.S. Cl.
USPC .............................................. 718/1; 709/246
(58) Field of Classification Search
USPC ................................................ 718/1; 709/246
See application file for complete search history.

(56) References Cited

U.S. PATENT DOCUMENTS

| | | | |
|---|---|---|---|
| 7,720,932 B2 | 5/2010 | Wei et al. | |
| 7,747,603 B2 | 6/2010 | Apparao et al. | |
| 2003/0018609 A1 | 1/2003 | Phillips et al. | |
| 2006/0242663 A1 | 10/2006 | Gogerty | |
| 2007/0043878 A1* | 2/2007 | Carlson et al. | 709/246 |
| 2007/0050175 A1 | 3/2007 | Schmelzer et al. | |
| 2007/0116037 A1 | 5/2007 | Moore | |
| 2009/0089078 A1 | 4/2009 | Bursey | |
| 2009/0157419 A1 | 6/2009 | Bursey | |
| 2009/0254529 A1 | 10/2009 | Goldentouch | |
| 2009/0254572 A1 | 10/2009 | Redlich et al. | |
| 2012/0102420 A1* | 4/2012 | Fukahori | 715/771 |
| 2012/0221454 A1* | 8/2012 | Morgan | 705/37 |
| 2012/0311564 A1* | 12/2012 | Khalid | 718/1 |

* cited by examiner

*Primary Examiner* — Diem Cao
(74) *Attorney, Agent, or Firm* — Yudell Isidore Ng Russell PLLC (57) ABSTRACT

A technique for personalizing feed content in virtualized computing environments includes accessing, using a data processing system, metadata associated with a virtual machine instance that is stored in a database. The technique also includes prioritizing, using the data processing system, feed content delivered to a client associated with the virtual machine instance based on the metadata.

18 Claims, 6 Drawing Sheets

TECHNIQUES FOR PERSONALIZING FEED CONTENT IN VIRTUALIZED COMPUTING ENVIRONMENTS

BACKGROUND

1. Technical Field

The present invention generally relates to techniques for personalizing feed content in computing environments and in particular to techniques for personalizing feed content in virtualized computing environments.

2. Description of the Related Art

In general, cloud computing refers to Internet-based computing where shared resources, software, and information are provided to users of computer systems and other electronic devices (e.g., mobile phones) on demand, similar to the electricity grid. Adoption of cloud computing has been aided by the widespread utilization of virtualization, which is the creation of a virtual (rather than actual) version of something, e.g., an operating system, a server, a storage device, network resources, etc. A virtual machine (VM) is a software implementation of a physical machine (e.g., a computer system) that executes instructions like a physical machine. VMs are usually categorized as system VMs or process VMs. A system VM provides a complete system platform that supports the execution of a complete operating system (OS). In contrast, a process VM is usually designed to run a single program and support a single process. A VM characteristic is that application software running on the VM is limited to the resources and abstractions provided by the VM. System VMs (also referred to as hardware VMs) allow the sharing of the underlying physical machine resources between different VMs, each of which executes its own OS. The software that provides the virtualization and controls the VMs is typically referred to as a VM monitor (VMM) or hypervisor. A hypervisor may run on bare hardware (Type 1 or native VMM) or on top of an operating system (Type 2 or hosted VMM).

Cloud computing provides a consumption and delivery model for information technology (IT) services based on the Internet and involves over-the-Internet provisioning of dynamically scalable and usually virtualized resources. Cloud computing is facilitated by ease-of-access to remote computing websites (via the Internet) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used. Cloud resources may be, for example, instances created from a base virtual machine (VM) image.

The availability of web feeds (feeds) allow individuals to subscribe to content of interest that has traditionally been delivered using a feed reader. Many feed readers (e.g., Google Reader™ is a web-based aggregator that is capable of reading Atom and really simple syndication (RSS) feeds on-line and off-line) allow a user to search through and sort feed content. However, while conventional feed readers deliver feeds to a user, conventional feed readers have not personalized delivered feed content.

BRIEF SUMMARY

Disclosed are a method, a data processing system, and a computer program product (embodied in a computer-readable storage medium) for personalizing feed content in virtualized computing environments.

A technique for personalizing feed content in virtualized computing environments includes accessing, using a data processing system, metadata associated with a virtual machine instance that is stored in a database. The technique also includes prioritizing, using the data processing system, feed content delivered to a client associated with the virtual machine instance based on the metadata. The prioritizing may include adding feed content to, removing feed content from, and/or visually enhancing (e.g., highlighting) feed content in the delivered feed content. The metadata may be updated based on various events (e.g., termination of the virtual machine instance).

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a computer program product (embodied in a computer-readable storage medium) for personalizing feed content in virtualized computing environments.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention.

The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Conventionally, the same feed content has been delivered to each user that accesses a cloud application instance, irrespective of interests of a user and reasons for the user accessing the cloud application instance. That is, in cloud computing environments, conventional solutions do not allow delivered feed content to be user customized. According to various aspects of the present disclosure, feed content is contextually related to metadata associated with virtual machine (VM) image instances (VM instances) of a user. Feed content provided to a user is then automatically personalized for the user based on the metadata. According to one or more aspects of the present disclosure, in response to a user adding one or more VM image instances (which provide all resources required to execute an application on a server) to a cloud computing environment of the user, a feed handler (e.g., a feed reader, a feed aggregator, etc.) accesses metadata associated with the one or more VM instances to prioritize feed content for the user. According to other aspects of the present disclosure, in response to a status of one or more VM instances for a user changing, a feed handler accesses metadata associated with the one or more VM instances to prioritize feed content for the user.

It should be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed, including client-server and peer-to-peer computing environments. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Cloud characteristics may include: on-demand self-service; broad network access; resource pooling; rapid elasticity; and measured service. Cloud service models may include: software as a service (SaaS); platform as a service (PaaS); and infrastructure as a service (IaaS). Cloud deployment models may include: private cloud; community cloud; public cloud; and hybrid cloud.

On-demand self-service means a cloud consumer can unilaterally provision computing capabilities, such as server time and network storage, as needed automatically without requiring human interaction with a service provider. Broad network access means capabilities are available over a network and accessed through standard mechanisms that promote use by heterogeneous thin or thick client platforms (e.g., mobile phones, laptops, and personal digital assistants (PDAs)). Resource pooling means computing resources of a provider are pooled to serve multiple consumers using a multi-tenant model, with different physical and virtual resources dynamically assigned and reassigned according to demand. In resource pooling there is a sense of location independence in that the consumer generally has no control or knowledge over the exact location of the provided resources but may be able to specify location at a higher level of abstraction (e.g., country, state, or datacenter).

Rapid elasticity means capabilities can be rapidly and elastically provisioned, in some cases automatically, to quickly scale-out and be rapidly released to quickly scale-in. To the consumer, the capabilities available for provisioning often appear to be unlimited and can be purchased in any quantity at any time. Measured service means cloud systems automatically control and optimize resource use by leveraging a metering capability at some level of abstraction that is appropriate to the type of service (e.g., storage, processing, bandwidth, and active user accounts). Resource usage can be monitored, controlled, and reported providing transparency for both the provider and consumer of the utilized service.

In an SaaS model the capability provided to the consumer is to use applications of a provider that are running on a cloud infrastructure. The applications are accessible from various client devices through a thin client interface such as a web browser (e.g., web-based e-mail). In the SaaS model, the consumer does not manage or control the underlying cloud infrastructure (including networks, servers, operating systems, storage, or even individual application capabilities), with the possible exception of limited user-specific application configuration settings.

In a PaaS model a cloud consumer can deploy consumer-created or acquired applications (created using programming languages and tools supported by the provider) onto the cloud infrastructure. In the PaaS model, the consumer does not manage or control the underlying cloud infrastructure (including networks, servers, operating systems, or storage), but has control over deployed applications and possibly application hosting environment configurations.

In an IaaS service model a cloud consumer can provision processing, storage, networks, and other fundamental computing resources where the consumer is able to deploy and run arbitrary software (which can include operating systems and applications). In the IaaS model, the consumer does not manage or control the underlying cloud infrastructure but has control over operating systems, storage, deployed applications, and possibly limited control of select networking components (e.g., host firewalls).

In a private cloud deployment model the cloud infrastructure is operated solely for an organization. The cloud infrastructure may be managed by the organization or a third party and may exist on-premises or off-premises. In a community cloud deployment model the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises. In a public cloud deployment model the cloud infrastructure is made available to the general public or a large industry group and is owned by an organization selling cloud services.

In a hybrid cloud deployment model the cloud infrastructure is a composition of two or more clouds (private, community, or public) that remain unique entities but are bound together by standardized or proprietary technology that enables data and application portability (e.g., cloud bursting for load-balancing between clouds). In general, a cloud computing environment is service oriented with a focus on statelessness, low coupling, modularity, and semantic interoperability. At the heart of cloud computing is an infrastructure that includes a network of interconnected nodes.

Figure 1:
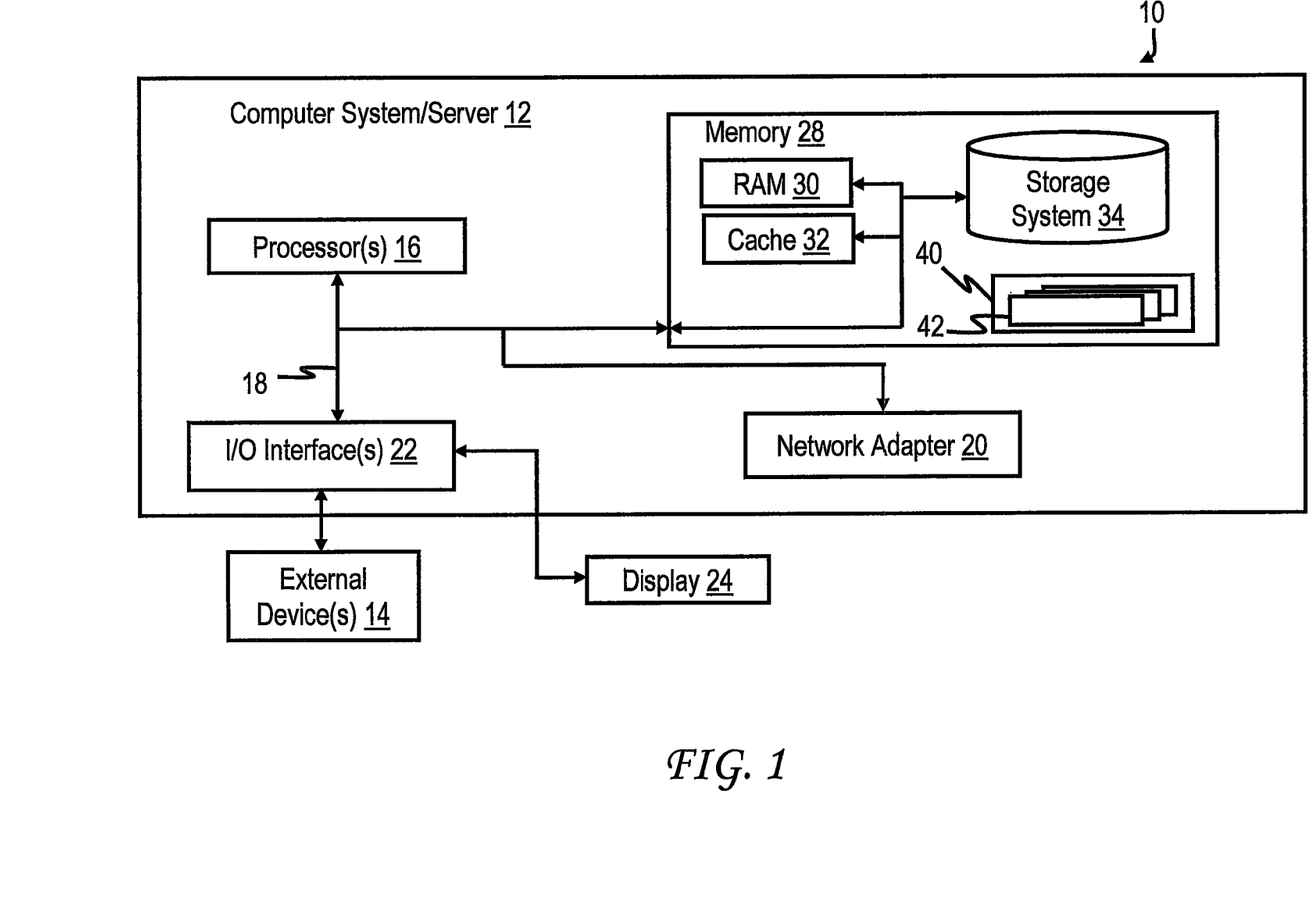
FIG. 1 depicts a relevant portion of an exemplary cloud computing node that is configured according to an embodiment of the present disclosure.

With reference to FIG. 1, a schematic of an exemplary cloud computing node 10 is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth herein. Cloud computing node 10 includes a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 (in cloud computing node 10) is illustrated in the form of a general-purpose computing device. The components of computer system/server 12 may include, but are not limited to, one or more processors or processing units (including one or more processor cores) 16, a system memory 28, and a bus 18 that couples various system components (including system memory 28) to processors 16. Bus 18 represents one or more of any of several types of bus structures, including a memory bus or memory controller bus, a peripheral bus, an accelerated graphics port, and a processor or local bus using any of a variety of bus architectures. By way of example, and not limitation, such architectures include the industry standard architecture (ISA) bus, the micro channel architecture (MCA) bus, the enhanced ISA (EISA) bus, the video electronics standards association (VESA) local bus, and the peripheral components interconnect (PCI) bus.

Computer system/server 12 typically includes a variety of computer system readable media. Such media may be any available media that is accessible by computer system/server 12, and includes both volatile and non-volatile media, removable and non-removable media. System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, nonvolatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces.

As will be further depicted and described herein, memory 28 may include at least one program product having a set (e.g., at least one) of program modules that are configured to carry out the functions of various disclosed embodiments. Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, redundant array of inexpensive disk (RAID) systems, tape drives, and data archival storage systems, etc.

Figure 2:
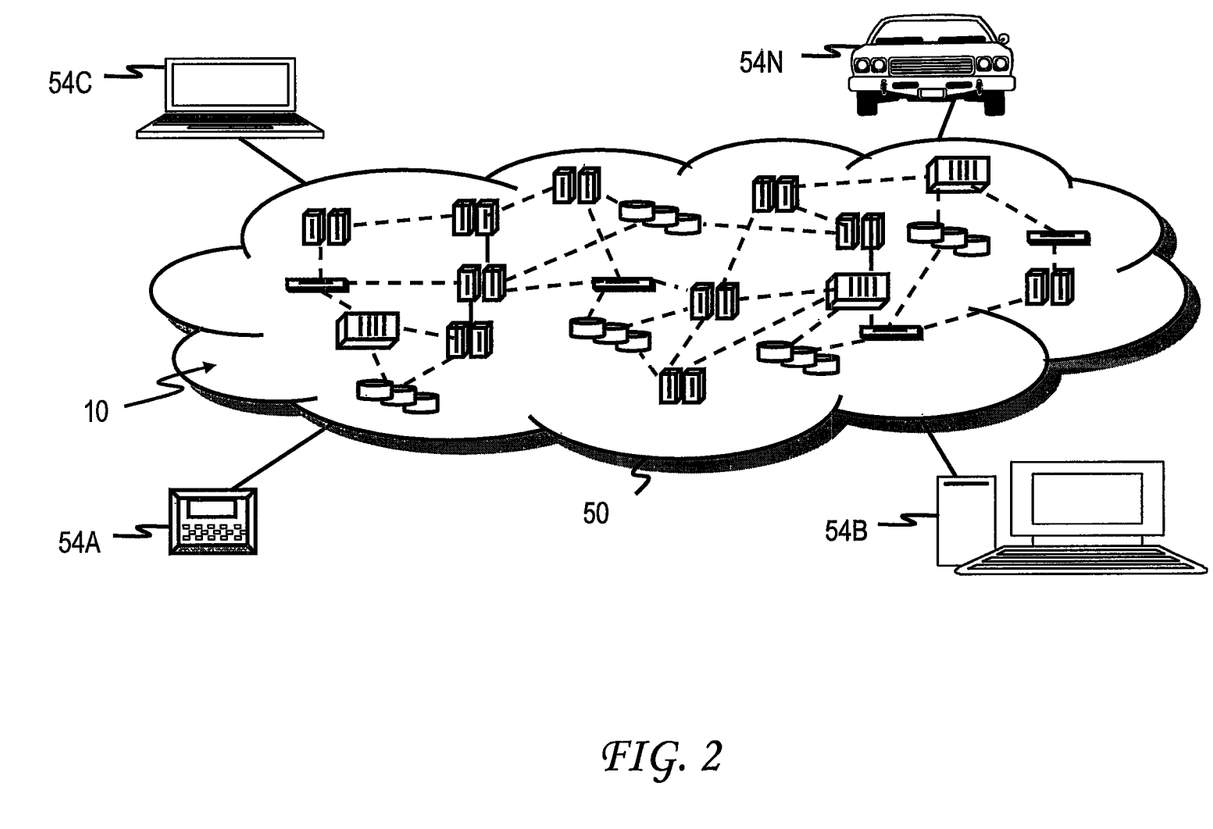
FIG. 2 depicts a relevant portion of an exemplary cloud computing environment that is configured according to an embodiment of the present disclosure.

With reference to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another and may be grouped (not shown) physically or virtually, in one or more networks, such as private, community, public, or hybrid clouds as described herein, or a combination thereof. In this manner, cloud computing environment 50 can offer infrastructure, platforms and/or software as services for which a cloud consumer does not need to maintain resources on a local computing device. It should be understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
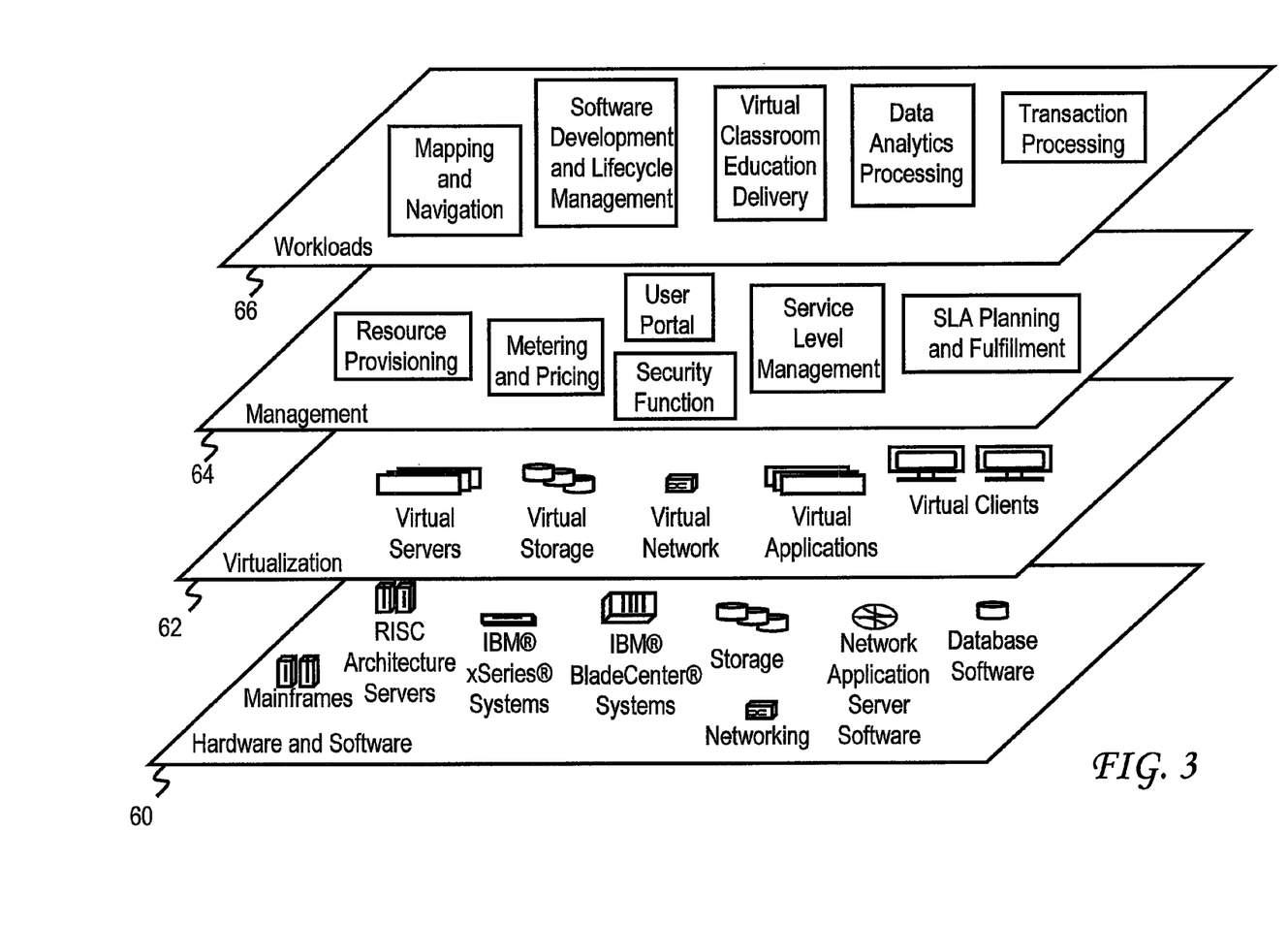
FIG. 3 depicts exemplary abstraction model layers of a cloud computing environment configured according to an embodiment of the present disclosure.

With reference to FIG. 3, a set of functional abstraction layers provided by cloud computing environment 50 (FIG. 2) is shown. It should be understood that the components, layers, and functions shown in FIG. 3 are intended to be illustrative only and embodiments of the invention are not limited thereto. As depicted in FIG. 3, cloud computing environment 50 includes a hardware and software layer 60, a virtualization layer 62, a management layer 64, and a workloads layer 66.

Hardware and software layer 60 includes various hardware and software components. As one example, the hardware components may include mainframes (e.g., IBM® zSeries® systems), reduced instruction set computer (RISC) architecture based servers (e.g., IBM pSeries® systems), IBM xSeries® systems, IBM BladeCenter® systems, storage devices, networks and networking components. As another example, the software components may include network application server software (e.g., IBM WebSphere® application server software) and database software (e.g., IBM DB2®, database software). IBM, zSeries, pSeries, xSeries, BladeCenter, WebSphere, and DB2 are trademarks of International Business Machines Corporation registered in many jurisdictions worldwide.

Virtualization layer 62 provides an abstraction layer in which virtual entities (e.g., virtual servers, virtual storage, virtual networks (including virtual private networks), virtual applications and operating systems, and virtual clients are included. As previously discussed, these virtual entities may be accessed by clients of cloud computing environment 50 on-demand. The virtual entities are controlled by one or more virtual machine monitors (VMMs) that may, for example, be implemented in hardware and software layer 60, virtualization layer 62, or management layer 64.

Management layer 64 provides various functions (e.g., resource provisioning, metering and pricing, security, user portal, service level management, and SLA planning and fulfillment). The resource provisioning function provides dynamic procurement of computing resources and other resources that are utilized to perform tasks within the cloud computing environment. The metering and pricing function provides cost tracking (as resources are utilized within the cloud computing environment) and billing or invoicing for consumption of the utilized resources. As one example, the utilized resources may include application software licenses.

The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

According to one or more embodiments of the present disclosure, a feed handler (which may implemented, for example, as a virtual application in virtualization layer 62 of cloud computing environment 50) accesses metadata associated with one or more VM instances to prioritize content of a feed for the user. The feed handler may access the metadata in response to, for example, a user adding one or more VM instances to a cloud computing environment of the user. The feed handler may also access the metadata in response to a change in the metadata. Moreover, the feed handler may access metadata associated with multiple VM instances of a user to prioritize feed content for the user.

The metadata associated with a VM instance may, for example, include: middleware deployed in the VM instance; application software deployed in the VM instance; an operating system deployed in the VM instance; a creation date of the VM instance; an expiration date of the VM instance; provisioning status (i.e., whether resources have been allocated or not) of the VM instance; and/or application instance tags in the VM instance. The metadata may, for example, be created by a virtual machine monitor (VMM) that controls the VM instance. According to one or more aspects of the present disclosure, a feed handler adds and/or removes feed content (from a feed) provided to a user such that feed content is relevant to the VM instances, which is assumed to correspond to interests of the user.

According to one or more other aspects of the present disclosure, a feed handler is configured to prioritize feed content based on metadata associated with a VM instance. For example, feed content associated with metadata of a VM instance may be given a higher priority when the VM instance has been running for a longer time period (assumes a user is still interested in feed content associated with a VM instance that has been running for a relatively long period of time). As another example, feed content associated with metadata of a VM instance may be given a lower priority when the VM instance has been running for a longer time period (assumes a user has mastered the subject matter of feed content associated with a VM instance that has been running for a relatively long period of time and, as such, is less interested in the feed content).

As yet another example, when multiple VM instances of a user include the same middleware and application software, feed content related to the middleware and application software may be given a higher priority. For example, assuming a user has five deployed VM instances that each employ a same OS, feed content related to the OS may be given higher priority than feed content related to a different OS. Feed content associated with user added tags may also be given higher priority. According to one or more embodiments, feed priority is indicated with one or more visual enhancements. For example, feed priority may be indicated by adding feed visual enhancements, such as highlighting, bolding, graying-out, icons, font-size, or font-family. In various embodiments, as VM instances of a user are added/removed and started/stopped feed content is updated to reflect interest changes of a user. In this manner, an individual user may be provided with unique feed content that is of current interest to the individual user.

It should be appreciated that the same information that is used to select feed content can also be used to suggest additional VM instances that may be of interest to a user. For example, a cloud computing environment may be configured to suggest that a user select a particular VM instance. As one example, when a user exhibits a propensity to provision application instances related to databases, a cloud computing environment may suggest that a user select a new DB2 Express-C™ VM instance.

Figure 4:
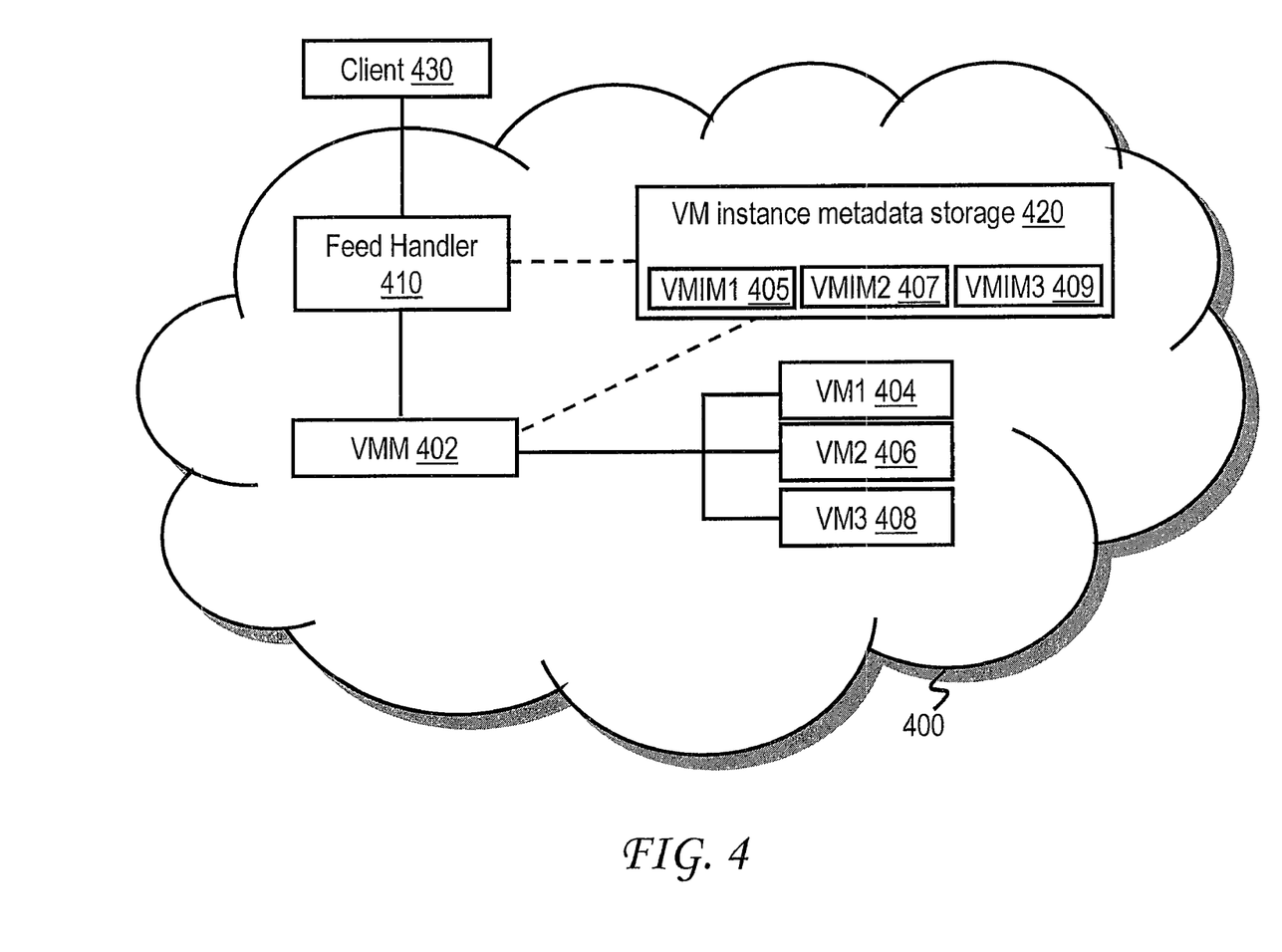
FIG. 4 is a diagram of a relevant portion of an exemplary cloud computing environment that includes a feed handler (executing on a data processing system) configured in accordance with various embodiments of the present disclosure to personalize feed content.

With reference to FIG. 4, an exemplary cloud computing environment 400 includes a feed handler 410 (executing on a data processing system) that is in communication with a virtual machine monitor (VMM) 402 that controls multiple virtual machines (VMs), e.g., VM1 404, VM2 406, and VM3 408 (executing on one or more data processing systems). In an alternative embodiment, feed handler 410 may execute on client 430. When feed handler 410 is deployed within cloud computing environment 400, VMM 402 may execute on the same server as feed handler 410 or on a different server. Similarly, VMM 402 may execute on the same server as VM1 404, VM2 406, and VM3 408 or on a different server.

As is shown in FIG. 4, virtual machine instance metadata storage 420 stores virtual machine instance metadata (VMIM) 405, 407, and 409 (labeled VMIM1, VMIM2, and VMIM3, respectively) for virtual machines VM1, VM2, and VM3, respectively. VMIM 405, 407, and 409 may be associated with a single user or multiple users. Feed handler 410 is also in communication with storage 420 and a client 430. Storage 420 may, for example, correspond to a database located on a hard disk drive (HDD) or a flash drive. Responsive to a request by a user (via client 430) for one or more feeds, feed handler 410 provides relevant feed content based on metadata associated with one or more VM instances associated with (the user of) client 430. In one or more embodiments, VMM 402 creates and/or updates metadata for VM instances and directly stores the metadata in storage 420 or provides the metadata to feed handler 420, which then stores the metadata in storage 420. Feed handler 410 may access storage 420 directly or may access storage 420 via VMM 402.

In one or more embodiments, in response to VMM 402 adding a VM instance (for a user) to cloud computing environment 400 and creating associated metadata, feed handler 410 initiates storage of metadata for the VM instance in storage 420. In response to VMM 402 terminating a VM instance (for a user) from cloud computing environment 400, feed handler 410 updates metadata for the terminated VM instance from storage 420. For example, when a user terminates all associated VM instances, feed handler 410 may delete all metadata associated with the user. While only three VMs are illustrated in cloud computing environment 400, it should be appreciated that more or less than three VMs may be implemented within a cloud computing environment configured according to the present disclosure. VMs 404, 406, and 408 may execute on different servers located in different geographical locations (e.g., different states (e.g., Texas, Missouri, and Michigan) within the United States or different countries (e.g., Canada, Mexico, and the United States)) or on one or more servers located in a same geographical location.

Figure 5:
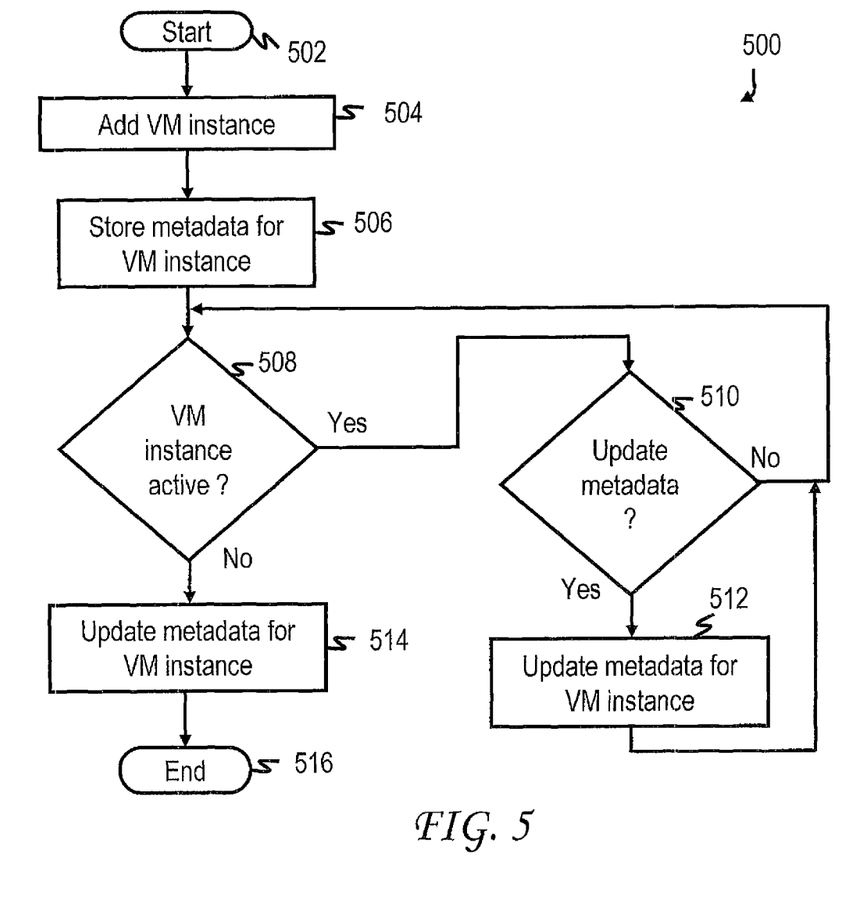
FIG. 5 is a flow chart for an exemplary process that implements techniques for personalizing feed content according to various embodiments of the present disclosure.

With reference to FIG. 5, a flow chart for an exemplary feed content personalization process 500 (configured according to an embodiment of the present disclosure) is illustrated. For ease of understanding, process 500 (which executes on VMM 402) is described in conjunction with cloud computing environment 400 of FIG. 4. Process 500 begins (e.g., in response to a request by a cloud consumer for services) at block 502, at which point control transfers to block 504. In block 504, VMM 402 adds (dispatches) a VM instance to a server (within cloud computing environment 400) to provide a service for a cloud consumer (user). While the discussion herein focuses on the dispatching a single VM instance, it should be appreciated that the techniques disclosed herein are broadly applicable to the dispatching of one or more VM instances to one or more servers to service a user.

Next, in block 506, VMM 402 creates metadata and initiates storage of the metadata for the dispatched VM instance in storage 420 (e.g., VMM 402 may directly store the metadata in storage 420 or request that feed handler 410 store the metadata in storage 420). The metadata associated with the dispatched VM instance may, for example, include: middleware deployed in the VM instance; application software deployed in the VM instance; an operating system deployed in the VM instance; a creation date of the VM instance; an expiration date of the VM instance; provisioning status (i.e., whether resources have been allocated or not) of the VM instance; and/or application instance tags in the VM instance.

Then, in decision block 508, VMM 402 determines if the VM instance is still active (e.g., VMM 402 determines if (user via) client 430 has requested termination of the VM instance, if the VM instance has completed an assigned task, or if an expiration time has been reached). While the VM instance is active in block 508, control transfers to decision block 510. In block 510, VMM 402 determines whether the metadata requires updating based on a status of the VM instance. For example, the metadata may require updating based on the fact that an execute time period assigned to the VM instance is about to expire or if the user has been utilizing the VM instance more than other VM instances associated with the user. In response to the metadata not requiring updating in block 510, control transfers to block 508. In response to the metadata requiring updating in block 510, control transfers from block 510 to block 512. In block 512, VMM 402 initiates updating of the metadata for the VM instance. Following block 512, control transfers to block 508.

In response to the VM instance no longer being active in block 508, control transfers to block 514. In block 514, VMM 402 updates metadata (e.g., initiates removal of the metadata for the terminated VM instance of the user while retaining metadata for replicated VM instances of the user that are still active) for the VM instance. When only one VM instance is associated with a user and the VM instance is terminated, VMM 402 may initiate deletion of the metadata for the terminated VM instance. Following block 514, control transfers to block 516 where process 500 ends and control returns to a calling process.

Figure 6:
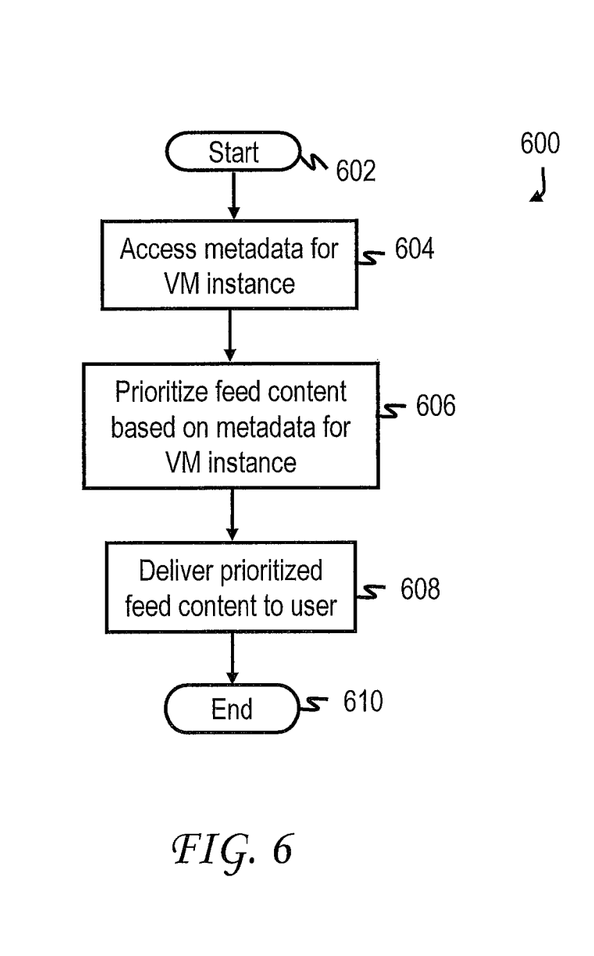
FIG. 6 is a flow chart for another exemplary process that implements techniques for personalizing feed content according to various embodiments of the present disclosure.

With reference to FIG. 6, a flow chart for another exemplary feed content personalization process 600 (configured according to an embodiment of the present disclosure) is illustrated. For ease of understanding, process 600 is described in conjunction with cloud computing environment 400 of FIG. 4. Process 600, which executes on feed handler 410, begins (e.g., in response to a request (subscription) by a user of client 430 for one or more feeds) at block 602, at which point control transfers to block 604. In block 604, feed handler 410 accesses metadata (stored in storage 420) for one or more VM instances associated with the user. For example, the metadata may be stored in one or more non-volatile storage devices of a storage area network (SAN) or network attached storage (NAS) included in cloud computing environment 400.

Next, in block 606, feed handler 410 prioritizes feed content for the user based on the metadata for the one or more VM instances associated with the user. As one example, if the metadata indicates that the user is interested in databases, feed handler 410 prioritizes database feed content provided to the user. As another example, if the metadata indicates the user is interested in operating systems, feed handler 410 prioritizes operating system feed content provided to the user. Then, in block 608, feed handler 410 delivers prioritized feed content to the user of client 430 based on the metadata associated with the user. Following block 608, control transfers to block 610 where process 600 ends and control returns to a calling process.

In the flow charts above, the methods depicted in FIGS. 5 and 6 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for personalizing feed content in virtualized computing environments, comprising:
   accessing, using a data processing system, metadata associated with a virtual machine instance, wherein the metadata are stored in a database and at least some of the metadata indicate interests of a user with respect to feed content delivered to a client; and
   prioritizing, using the data processing system, the feed content delivered to the client associated with virtual machine instance based on the metadata, wherein a priority of the delivered feed content is assigned based on a time period for which the virtual machine instance has been running 2. The method of claim 1, wherein the accessing is performed in response to addition of the virtual machine instance to a virtualized computing environment.

3. The method of claim 1, wherein the accessing is performed in response to a change in status of the virtual machine instance.

4. The method of claim 1, wherein the metadata associated with the virtual machine instance identifies one or more of middleware deployed in the virtual machine instance, application software deployed in the virtual machine instance, an operating system deployed in the virtual machine instance, a creation date of the virtual machine instance, an expiration date of the virtual machine instance, provisioning status of the virtual machine instance, and application instance tags for the virtual machine instance.

5. The method of claim 1, wherein the prioritizing includes adding feed content to or removing feed content from the delivered feed content.

6. The method of claim 1, further comprising:
   updating the metadata based on a status of the virtual machine instance.

7. The method of claim 1, wherein a priority of the delivered feed content is indicated by a visual enhancement.

8. A computer program product for personalizing feed content in virtualized computing environments, the computer program product comprising:
   a computer-readable storage medium having computer-readable program code embodied thereon, wherein the computer-readable program code, when executed by a data processing system, causes the data processing system to:
     access, using the data processing system, metadata associated with a virtual machine instance, wherein at least some of the metadata indicate interests of a user with respect to feed content delivered to a client; and
     prioritize, using the data processing system, the feed content delivered to the client associated with the virtual machine instance based on the metadata, wherein a priority of the delivered feed content is assigned based on a time period for which the virtual machine instance has been running.

9. The computer program product of claim 8, wherein the access is performed in response to addition of the virtual machine instance to a virtualized computing environment.

10. The computer program product of claim 8, wherein the access is performed in response to a change in status of the virtual machine instance.

11. The computer program product of claim 8, wherein the metadata associated with the virtual machine instance identifies one or more of middleware deployed in the virtual machine instance, application software deployed in the virtual machine instance, an operating system deployed in the virtual machine instance, a creation date of the virtual machine instance, an expiration date of the virtual machine instance, provisioning status of the virtual machine instance, and application instance tags for the virtual machine instance.

12. The computer program product of claim 8, wherein the feed content is prioritized by adding feed content to or removing feed content from the delivered feed content.

13. The computer program product of claim 8, wherein the computer-readable program code, when executed by a data processing system, causes the data processing system to:
   update the metadata based on a status of the virtual machine instance.

14. The computer program product of claim 8, wherein a priority of the delivered feed content is indicated by a visual enhancement.

15. A data processing system, comprising:
   a memory; and
   a processor core coupled to the memory, wherein the processor core is configured to:
     access metadata associated with a virtual machine instance, wherein at least some of the metadata indicate interests of a user with respect to feed content delivered to a client; and prioritize the feed content delivered to the client associated with the virtual machine instance based on the metadata, wherein a priority of the delivered feed content is assigned based on a time period for which the virtual machine instance has been running.

16. The data processing system of claim 15, wherein the access is performed in response to a change in status of the virtual machine instance.

17. The data processing system of claim 15, wherein the access is performed in response to addition of the virtual machine instance to a virtualized computing environment.

18. The data processing system of claim 15, wherein the processor core is further configured to:
   update the metadata based on a status of the virtual machine instance.

* * * * *